United States Patent [19]

Jabarin et al.

[11] Patent Number: 4,713,270

[45] Date of Patent: Dec. 15, 1987

[54] HEATSET HIGH BARRIER CONTAINER

[75] Inventors: Saleh A. Jabarin, Holland; Prakash R. Ajmera, Toledo, both of Ohio

[73] Assignee: Owens-Illinois Plastic Products Inc., Toledo, Ohio

[21] Appl. No.: 841,649

[22] Filed: Mar. 20, 1986

[51] Int. Cl.$^4$ ............................................... B65D 1/00
[52] U.S. Cl. ................................ 428/35; 525/444; 525/933; 428/911
[58] Field of Search .................. 428/35, 911; 525/444, 525/933

[56] References Cited

U.S. PATENT DOCUMENTS

| | | | |
|---|---|---|---|
| 4,398,017 | 8/1983 | Go | 528/173 |
| 4,476,170 | 10/1984 | Jabarin | 428/35 |
| 4,551,368 | 11/1985 | Smith | 525/444 |
| 4,565,851 | 1/1986 | Barbee | 525/437 |
| 4,578,295 | 3/1986 | Jabarin | 428/35 |

*Primary Examiner*—Patricia A. Short
*Attorney, Agent, or Firm*—H. G. Bruss

[57] ABSTRACT

A high barrier heatset intimate fusion blend article is disclosed where the article includes a blend of a high barrier copolyester, formed from terephthalic acid, ethylene glycol and 1,3 bis(2-hydroxyethoxy) benzene, and poly(ethylene terephthalate) (PET). The PET/copolyester blend articles are formed using a blow-molding and heatsetting process to rapidly achieve a high percentage of crystallinity of the PET in the article. The articles have excellent gas barrier and mechanical strength properties, high thermal stability and remain optically clear after heatsetting.

3 Claims, No Drawings

HEATSET HIGH BARRIER CONTAINER

BACKGROUND OF THE INVENTION

This invention relates to improved biaxially oriented, heatset hollow containers wherein the containers are made of a material comprising an intimate fusion blend of poly(ethylene terephthalate) and a high barrier copolyester formed from isophthalic or terephthalic acid, ethylene glycol and 1,3, bis(2-hydroxyethyoxy)benzene.

Polyester containers, particularly those made from poly(ethylene terephthalate), are well-suited for packaging of soft drink beverages, especially in large size containers, such as 2 liter sizes. However, there is a need in the industry to provide a polyester container with longer shelf life, especially small size containers.

Polyester containers made from poly(ethylene terephthalate) do not have sufficient thermal stability or gas barrier properties for use in packaging hot fill or oxygen sensitive foods. Therefore, there is also a commercial need to extend the application of containers made from poly(ethylene terephthalate) to packaging oxygen sensitive foods and to packaging hot fill foods or foods requiring pasturization or sterilization.

In order to improve the physical properties of polyester containers various polymers have been admixed with polyesters in an attempt to improve container gas barrier properties performance. However, such admixtures generally show moisture sensitivity, are not optically clear upon blowmolding and are not sufficiently thermally stable for use in hot fill applications.

The copending application, Ser. No. 631,263, now U.S. Pat. No. 4,578,295, discloses a container formed from a blend of two different polyester materials comprising an admixture of a poly(ethylene terephthalate) and a preferred copolyester of isphthalic or terephthalic acid, ethylene glycol and 1,3 bis(2-hydroxyethoxy)benzene. The container was formed using a conventional blowmolding process. However, such containers are not suitable for use in packaging hot food items since the blended composition of the plastic containers has a low onset-of-shrinkage temperature of about 60° C. The low thermal stability of such blended composition is generally too low for most hot fill food processing and packaging uses.

We have found a commercial solution to these problems. We have discovered that an article made from an intimate fusion blend of poly(ethylene terephthalate) and the high gas barrier copolyester formed from isophthalic or terephthalic cid, ethylene glycol and 1,3,bis(2-hydroxyethoxy)benzene, when made using a blowmolding and heatsetting process provides an improved article having high gas barrier properties and high thermal stability while retaining optically clarity and maintaining advantageous mechanical strength properties.

SUMMARY OF THE INVENTION

The present invention relates to a high barrier article composed of an intimate fusion blended composition of poly(ethylene terephthalate) hereinafter sometimes referred to as PET, and the high barrier copolyester disclosed in U.S. Pat. No. 4,398,017 formed from isophthalic or terephthalic acid, ethylene glycol, and 1,3 bis(2-hydroxyethyoxy)benzene. The blended composition of the present invention is biaxially oriented and strain-hardenable during heat setting orientation conditions to produce excellent rigid containers.

The hollow, intimate fusion blend articles or containers of the present invention, when formed using a blowmolding and heatsetting process, have improved barrier properties and thermal stability. In addition, the heatset intimate fusion blend containers of the present invention are optically clear and have desirable mechanical strength properties.

The containers are formed from an intimate blended composition of two different polymers and are formed by blowmolding using a heatsetting step in the manufacturing process of the container. One process practiced for making the container of the present invention features dry-blending PET and the copolyester (30 percent copolyester by weight), melting the PET and copolyester in an extruder to form an intimate fusion blended composition, injection molding the blended composition into a parison, briging the parison to orientation temperature, inflating the parison in a blowmold which has been preheated to a higher, heatsetting temperature, and holding the container or other hollow PET/copolyester blended article against the mold wall for the short time to crystallize the PET and thus heatset the intimate fusion blended container. Additionally, the blowmolded and heatset containers of to the present invention maybe cooled to a temperature of about 100° C., while maintaining the container under pressure, then exhausting the pressure in the container to essentially atmospheric or ambient pressure, releasing the container from the mold, and allowing the container to cool to ambient temperature without internal pressure.

It is an ojbect of the present invention to provide an improved high barrier container composed of an intimate fusion blend of PET and a high barrier copolyester which has excellent gas barrier and mechanical strength properties, high thermal stability and remains optically clear after heatsetting.

Other objects, as well as aspects and advantages, of the present invention will become apparent from a study of the specification.

DETAILED DESCRIPTION OF THE INVENTION

The present invention provides a high barrier, heatset article which is formed from an intimate fusion blend a high gas barrier copolyester and poly(ethylene terephthalate), and which articles are formed by a blowmolding process using a heatsetting step. The preferred high gas barrier copolyester is formed from isophthalic or terephthalic acid, ethylene glycol and 1,3, bis(2-hydroxyethoxy)benzene and is disclosed in U.S. Pat. No. 4,398,017.

In the high barrier container of the present invention it is particularly advantageous to have the copolyester be no more than approximately 30% by weight, of the high barrier container. While higher percentages of the copolyester can be included in the container of the present invention, there is not a significant improvement in the overall balanced properties, such as barrier properties and mechanical strength properties, if such copolyester in the high barrier container is more than 30% by weight of the container.

The preferred PET material, according to the present invention, is formed from the reaction between ethylene glycol and terephthalic acid or an ester thereof, particularly dimethyl terephthalate, and has an inherent viscosity of at least 0.6. Other PET materials useful herein are poly(ethylene terephthalate) polymers including polymers where at least 97% of the polymer contains the repeating ethylene terephthalate units with the remainder being minor amounts of ester-forming components, and copolymers or ethylene terephthalate wherein up to about 10 mole percent of the polymer is prepared from the monomer units selected from butane-1,4-diol; diethylene glycol; propane-1,3-diol; poly(tetramethylene glycol); poly(propylene glycol); 1,4-hydroxymethylcyclohexane and the like, substituted for the glycol moiety in the preparation of the polymer, or isophthalic; naphthalene,1,4- or 2,6-dicarboxylic; adipic; sebacic; decane-1,10-dicarboxylic acids, and the like, substituted for up to 10 mole percent of the acid moiety (terephthalic acid) in the preparation of the polymer.

The poly(ethylene terephthalate) polymer can include various additives that do not adversely affect the polymer. For instance, some such additives are stabilizers, e.g., antioxidants or ultraviolet light screening agents, extrusion aids, additives designed to make the polymer more degradable or combustable, and dyes or pigments. Moreover, cross-linking or branching agents such as are disclosed in U.S. Pat. No. 4,188,357 can be included in small amounts in order to increase the melt strength of the poly(ethylene terephthalate).

The preferred copolyesters for use in the present invention are copolyesters based on terephthalic or isophthalic acid or both, ethylene glycol and which contain 1,3 bis(2-hydroxyethoxy)benzene as one of the diol reactants in order to prepare the solid copolyesters. Such copolyesters, as described for blending with PET according to the present invention, are disclosed in U.S. Pat. No. 4,398,017 which is incorporated in full herein by reference. The solid thermoplastic copolyesters are formed of the polymeric reaction product of:

(A) reactant(s) selected from isophthalic acid, terephalic acid, and their $C_1$ to $C_4$ alkyl esters, and any mixture thereof in any proportion, (B) reactants, 1,3 bis(2-hydroxyethoxy)benzene plus ethylene glycol, and optionally one or more other ester forming dihydroxy organic hydrocarbon reactant(s), and, optionally, (C) reactant, bis(4-beta-hydroxyethoxyphenyl)sulfone, wherein (1) the amount of said 1,3 bis(2-hydroxyethoxy)benzene is 5–90, usually not less than 10 or more than 80, mole percent of the amount of (A) reactants, (2) the combined amount of (B) and (C) reactant is about 110 to 300 mole percent of the amount of (A) reactants, (3) the amount of said other ester forming dihydroxy organic hydrocarbon reactant(s) is zero to 20, usually zero to 15, mole percent of the amount of said (A) reactants, and (4) the combined amount of said (C) reactant plus said 1,3 bis(2-hydroxyethoxy)benzene and said other ester forming dihydroxy organic hydrocarbon reactant(s) is not over 90 mole percent of said (A) reactants.

In the foregoing copolyesters the optional (C) reactant, bis(4-betahydroxyethoxyphenyl)sulfone, is used when it is necessary to raise the glass transition temperature for a particular application or use.

When less than 5 mole percent of 1,3 bis(2-hydroxyethoxy)benzene is used, the effect on permeabilities is not as significant as desired. When over 90 mol percent is used, the reaction or polycondensation rate is lower than desired.

The copolyesters so produced are solid copolyesters having an inherent viscosity of about 0.4 dl/g., usually at least 0.5 and for most commercial applications, at least 0.7 dl/g.

The high barrier container of the present invention is preferably formed with conventional injection molded parisons made of a blend of the copolyester and PET. Such parisons are generally elongate tubes of cylindrical cross-section which have an open upper threaded finish which accepts a closure, a cylindrical elongate main body portion, and a closed hemispherical bottom portion. The parison when expanded results in a narrow neck container having a generally cylindrical main body portion and a closed hemispherical bottom portion. Such parisons and final container shapes are preferred but other geometrical configurations may be selected within the scope of the present invention.

A preferred process for forming the heatset containers of the present invention is disclosed in the U.S. Pat. No. 4,512,948 which is incorporated herein by reference. The hot heatsetting mold equipment, parison handling, container transfer and cold mold equipment are all of conventional design and are not part of the invention. The parisons can be injection molded and are preheated to the orientation range by conventional parison preheaters available in the marketplace. Typically, a transfer time between the two molds is between three and fifteen seconds. Similarly, the reduced pressure needed for such transfer pressure is between 5 and 24 psi.

Another preferred process practiced for making the intimate fusion blended containers of the present invention is disclosed in U.S. Pat. No. 4,476,170 which is incorporated herein by reference. In addition, various other processes for blowmolding a parison that include a heatsetting step in such process can be practiced for producing the intimate fusion blended containers of the present invention.

The high barrier fusion blended heatset containers of the present invention show increased thermal stability as shown by the unexpectedly high on set-of-shrinkage temperature as compared to the PET/copolyester blend non-heatset containers. In addition, the fusion blended heatset containers of the present invention show excellent gas barrier properties with respect to the retention of carbon dioxide and the exclusion of oxygen from the internal spaces of the package. Also, the containers so prepared show excellent optical clarity. The characteristics of barrier properties are particularly important for oxygen sensitive foods and wines. Such high barrier containers also show excellent mechanical properties.

The following Tables illustrate the superior properties of the high barrier PET/copolyester blend heatset containers of the present invention as compared with conventional containers fabricated from PET and non-heatset blended containers, wherein PET represents poly(ethylene terephthalate) and where the containers are conventionally shaped narrow neck, cylindrical sidewalled containers having hemispherical bottoms.

TABLE I

| | Blend (20% Copoly.) Non-Heatset | Blend (20% Copoly.) Heatset | | | PET Heatset | |
|---|---|---|---|---|---|---|
| | | Crystallinity | | | | |
| Heatset Temp. | — | 225° C. | 215° C. | 215° C. | 215° C. | 215° C. |
| Heatset Time | — | 1.0 Sec. | 1.3 Sec. | 6.0 Sec. | 1.3 Sec. | 6 Sec. |
| Composite Density | 1.3585 | 1.3890 | 1.3845 | 1.3880 | — | — |
| Density of PET | 1.3646 | 1.4030 | 1.3977 | 1.4022 | 1.3900 | 1.3915 |
| % Cryst. of PET | 25.8 | 57.3 | 52.9 | 56.6 | 46.5 | 47.8 |

As the data of Table I show, the high barrier PET/copolyester blend heatset containers of the present invention have a surprisingly high degree of crystallinity of the PET and such PET is very rapidly crystalized in the presence of the copolyester upon heatsetting of the PET/copolyester intimate fusion blend containers of the present invention. This is especially surprising since in the preferred embodiments of the invention the copolyester accounts for as much as 20 to 30%, by weight, of the PET/copolyester blended container.

The PET in the PET/copolyester blended heatset containers of the present invention crystallizes very rapidly to a high crystallinity level in the presence of the copolyester when heatset. At a given heatsetting condition, the crystallinity of PET was found to increase by about 7–9% over the heatset PET containers.

The rapid crystallization of PET to a higher level in the presence of the copolyester is unexpected, since it would be expected in the industry that the degree and rate of crystallization of a container made of a blend of PET and a copolyester would be no more than a container made of PET alone, or alternatively it would be expected that the degree and rate of crystallization of a container made of a blend of PET and a copolyester would be lower than the PET container.

As shown in Table IIa the PET/20% copolyester heatset blend container has a 31% improvement in $O_2$ barrier properties over the PET/20% copolyester non-heatset blend container, while the PET/20% copolyester non-heatset blend container only had about 25% improvement in $O_2$ barrier properties over the non-heatset PET container.

TABLE IIa

Barrier Properties
Oxygen Whole-Package Permeability-73° F., Wet/Wet
Sample: ½ - Liter PET/20% copolyester blend

| Half-Liter Bottle Sample | Bottle Description | Empty Weight (Grams) | Oxygen Q-Value cc(STP)/ day atm | Overflow Volume (ml) |
|---|---|---|---|---|
| #1 | Nonheatset | 23.67 | .143 | 507.4 |
| #2 | Nonheatset | 23.66 | 0.130 | 505.2 |
| Average: | Nonheatset | 23.66 | 0.1365 | 506.3 |
| #1 | Heatset | 23.66 | 0.095 | 517.2 |
| #2 | Heatset | 23.66 | 0.095 | 517.2 |
| Average: | Heatset | 23.65 | 0.094 | 517.3 |

Improvement of Heatset over Nonheatset #1: 34%
Improvement of Heatset over Nonheatset #2: 28%
Improvement of Heatset over Nonheatset Average 1 & 2: 31% 2%

The above data were obtained using a whole package. In order to illustrate the barrier improvement over PET and pure copolyester, we measured the barrier properties of the sidewall of various containers, as shown in Table IIb. In this case it clearly shows that the heatset blend offers barrier improvement over that of the pure copolyester, which is an unexpected result.

TABLE IIb

| Material | $O_2$ Permeability cc(STP)Mil/ 100 in$^2$ day atm | % Improvement Over PET Nonheatset |
|---|---|---|
| Nonheatset PET | 3.7 | |
| Heatset PET | 2.6 | 29% |
| 20% Blend Nonheatset | 2.24 | 39% |
| 20% Heatset Blend | 1.35 | 63.5% |
| Copolyester | 1.7 | 54% |

Thus, the heatset PET/20% copolyester blend container of the present invention shows over a 60% improvement in $O_2$ barrier properties over the non-heatset PET container.

The high degree of crystallinity of the PET in the PET/copolyester blend container of the present invention results in an unexpected improvement in the $O_2$ barrier properties. As the data of Table II clearly illustrate, the heatset PET/copolyester blended containers of the present invention are substantially superior in $O_2$ barrier properties. Of prime importance is the recognition that the high barrier PET/copolyester blend heatset containers of this invention show significantly higher barrier properties over the non-heatset blend and the non-heatset PET containers. The actual values for reduced $O_2$ transmission are substantially higher than predictable, thus illustrating the unexpected results in the heatset blend containers.

To demonstrate that the PET/copolyester blend heatset containers of the present invention show significantly improved barrier properties but do not sacrifice mechanical properties, the high barrier PET/copolyester containers were tested to determine the important mechanical properties of elastic modulus, yield stress, yield strain, ultimate strength and ultimate elongation. The results set forth below are for the high barrier heatset containers of the present invention composed of a blend of 20% copolyester/PET.

With respect to the physical properties described in Table III, such properties are defined herein as follows: Modulus is the measure of the stiffness of the containers, as defined by ASTM standard D-638. Yield stress is defined as the resistance to creep under heat and/or pressure of a container wall portion, as defined by ASTM standard D-638. Yield strain is defined as the percent of elongation to which a section of containers may be subjected and then not return 100% to its original dimensions by elastic recovery, as defined by ASTM standard D-638. Ultimate strength is a measure of the internal pressurization which a container can tolerate prior to irrevocable rupture, as defined in ASTM standard D-638. Ultimate elongation is a measure of impact strength of the material, as defined in ASTM standard D-638. The elastic modulus and ultimate strength in hoop direction for heatset container were found to be significantly better than for the non-heatset container. Other properties were found to be comparable.

TABLE III

| Property | Mechanical Properties | | | |
|---|---|---|---|---|
| | 20% Copoly Blend Non-Heatset | | 20% Copoly Blend Heatset | |
| | Axial | Hoop | Axial | Hoop |
| Elastic modulus, kpsi | 559 | 449 | 519 | 704 |
| | 25 | 35 | 13 | 54 |
| Yield stress, kpsi | 15.7 | 14.8 | 15.0 | 16.2 |
| | 0.5 | 1.6 | 0.3 | 1.3 |
| Yield strain, % | 4.3 | 3.8 | 4.1 | 3.3 |
| | 0.3 | 0.4 | 0.4 | 0.3 |
| Ultimate strength, kpsi | 23.0 | 19.4 | 21.0 | 26.6 |
| | 1.0 | 2.5 | 1.5 | 1.6 |
| Ultimate elongation | 31 | 31 | 59 | 28 |
| | 5 | 9 | 9 | 2 |

An important advantage of the present invention is that the PET/copolyester blend heatset containers are useful in hot fill applications. In hot filled foods, such as catsup or soy sauce, and in pasteurized foods, such as beer, it is critical that the plastic containers not only have good barrier properties and mechanical strength but also that the containers resist shrinkage and gross deformation upon exposure to elevated hot filling and pasturization temperatures.

As the data in Table IV illustrate, the thermal stability of the PET/copolyester blend heatset containers of the present invention is unexpectedly high. Ordinarily, when PET is blended with another material, such as a copolyester, the onset-of-shrinkage temperature is much lower than the onset-of-shrinkage temperature of a PET container alone.

According to an important feature of the present invention, the PET/copolyester blend heatset containers have an improved resistance to shrinkage and an improved resistance to gross deformation and shape upon exposure to an elevated temperature. Thus, quite surprisingly, the onset-of-shrinkage temperature for the PET/copolyester blend heatset container of the present invention is unexpectedly higher than the non-heatset PET/copolyester blend container and is favorably comparable to the PET heatset container.

Thermal stability of the container is determined by measuring the onset temperature of shrinkage. The onset-of-shrinkage temperature referred to herein was determined as described in Brady and Jabarin "Thermal Treatment of Cold-Formed Poly(Vinyl Chloride) Polymer Engineering and Science", pp. 686–90 of Vol. 17, No. 9, September 1977, except that the samples were cut from the sidewalls of the bottles. No thermal treatment was effected on the cut samples prior to the tests. The onset-of-shrinkage temperature for the sidewall of various containers is described in Table IV.

TABLE IV

| Onset-of-shrinkage | |
|---|---|
| PET Heatset | 110° C. |
| PET/20% Copolyester blend Heatset | 107° C. |
| PET Non-Heatset | 60° C. |

TABLE IV-continued

| Onset-of-shrinkage | |
|---|---|
| PET/20% Copolyester blend Non-Heatset | 60° C. |

Ordinarily, when a copolyester is blended into a material such as PET, the matrix formed results in separation of the copolyester from the PET during a heatsetting process, thus causing a decrease in optical clarity. According to an important feature of the present invention, when the PET/copolyester blend container is heatset the copolyester does not separate out. Rather, a matrix is formed having a fine dispersion of the copolyester in the PET. Thus, referring to the data of Table V, it is shown that the PET/copolyester blend heatset container of the present invention remains essentially optically clear. The optical clarity is measured by determining the percentage of haze on Gardner hazemeter. Samples (20 mil or less in thickness) showing the haze value of 10% or less are considered in the industry to be optically clear. As shown in Table V heatset PET/20% copolyester blend containers of the present invention have about 2% haze. Thus, the percentage haze for the heatset PET/copolyester blend containers of the present invention are significantly lower than 10% and therefore are optically clear.

TABLE V

| Haze Measurements | |
|---|---|
| Sample | % Haze |
| PET/20% Copolyester Blend Non-Heatset | 1.9 |
| PET/20% Copolyester Blend Heatset | 2.2 |

From the foregoing description, it will be appreciated that the PET/copolyester blend heatset containers of the present invention have several important advantages. Upon heatsetting of the PET/copolyester blend containers the PET in the PET/copolyester blended composition is very rapidly crystallized and such crystallization of the PET occurs to an unexpectedly high degree. As such, not only do the PET/copolyester blend heatset containers have significantly increased barrier properties over non-heatset PET/copolyester blend containers, but also the heatset PET/copolyester blend containers of the present invention have increased thermal stability over the non-heatset PET/copolyester blend containers.

As a consequence, the containers of the present invention are especially well-suited for use in such applications where barrier properties are important and in hot fill applications. Further, the PET/copolyester blend heatset containers of the present invention do not sacrifice mechanical strength properties and such containers maintain optical clarity upon heatsetting of the PET/copolyester blend containers.

As will be evident to those skilled in the art, various modifications of this invention can be made or followed in the light of the foregoing disclosure and discussion without departing from the spirit and scope of the disclosure or from the scope of the claims.

All patents and documents referred to herein are hereby incorporated by reference.

We claim:

1. A transparent hollow high barrier, thermally stable article obtained by blow molding and heatsetting an intimate fusion blend of a poly(ethylene terephthalate), and a high barrier copolyester formed of the polymeric reaction product of (A) reactant(s) selected from the group consisting of isophthalic acid, terephalic acid, and their $C_1$ to $C_4$ alkyl esters, and any mixture thereof in any proportion, (B) reactants, 1,3(2-hydroxyethoxy)benzene plus ethylene glycol, and optionally one or more other ester forming dihydroxy organic hydrocarbon reactant(s), and optionally, (C) reactant, bis(4-betahydroxyethoxyphenyl)sulfone, wherein:

(1) the amount of said 1,3 bis(2-hydroxyethoxy)-benzene is 5–90 mole percent of the amount of A reactants, (2) the combined amount of B and C reactant is about 110 to 300 mole percent of the amount of A reactants, (3) the amount of said other ester forming dihydroxy organic hydrocarbon reactant(s) is zero to 20 mole percent of the amount of said A reactants, and (4) the combined amount of said (C) reactant plus said 1,3 bis(2-hydroxyethoxy)benzene and said other ester forming dihydroxy organic hydrocarbon reactant(s) is not over 90 mole percent of said A reactants, said copolyester being present in an amount from about 20 percent to about 30 percent, by weight, of said article.

2. The transparent hollow high barrier, thermally stable article of claim 1 wherein said copolyester is in an amount of about 30 percent, by weight, of said article.

3. The transparent hollow high barrier, thermally stable article of claim 1 wherein said high barrier copolyester is in an amount of about 20 percent, by weight, of said article.

* * * * *